Patented Oct. 28, 1924.

1,513,139

UNITED STATES PATENT OFFICE.

HARLAN L. TRUMBULL AND JOHN B. DICKSON, OF AKRON, OHIO, ASSIGNORS TO THE B. F. GOODRICH COMPANY, OF NEW YORK, N. Y., A CORPORATION OF NEW YORK.

METHOD FOR THE DISPERSION OF GUM INTO A COLLOIDAL SUBSTANCE.

No Drawing.   Application filed September 7, 1922.   Serial No. 586,784.

*To all whom it may concern:*

Be it known that we, HARLAN L. TRUMBULL and JOHN B. DICKSON, citizens of the United States, residing at Akron, in the county of Summit and State of Ohio, have invented a certain new and useful Method for the Dispersion of Gum into a Colloidal Substance, of which the following is a specification.

This invention relates to the art of producing a mixture of a gum and a colloid, and is especially applicable to the production of a mixture of a gum and a hydrophilic colloid in which the gum is dispersed in the hydrophilic colloid, the latter constituting a continuous phase.

Our object is to provide a convenient, economical and dependable method for producing a mixture of the character described, and to provide a product in which the proportion of the gum dispersed in the colloid is such as to adapt the mixture for uses such as the production of an artificial rubber latex by thinning with water a mixture of the character described containing finely dispersed raw rubber.

In our preferred practice, to produce, for example, a dispersion of natural, uncured rubber in a hydrophilic colloid such as glue, casein, gluten, sodium resinate, gum arabic, or similar material, such colloid is first mixed with water to produce a solution or paste, preferably of high viscosity, and a quantity of this paste is placed upon a tight rubber mill or similar device.

To the bank of such paste, upon the mill, the rubber, preferably first softened, as by mastication or by the addition of a softening agent such as paracumarone, or other tacky softener, is added in small pieces and is gradually worked into the viscous water solution or paste of the hydrophilic colloid. In order to avoid inversion of phase in the mixture which is formed on the rolls, it is desirable to add the rubber slowly and to compensate for evaporation by frequent additions of water in small quantity.

Following the procedure above outlined, it is possible to prepare dispersions of rubber in a water paste of hydrophilic colloid in which the ratio of rubber to total solids is of the same order of magnitude as in rubber latex, concentrations of rubber from zero to more than 80% being obtainable.

By the addition of water to the putty-like mass which is eventually produced upon the mill, and in which all the rubber has been dispersed into very small particles, it is possible to prepare a colloidal solution closely resembling rubber latex in its physical properties.

If an excess of rubber is added either at the end of the mixing operation or before the ultimate high concentration of rubber has been reached, an inversion of phase may occur, giving a dispersion of hydrophilic colloid in rubber. A batch in which such inversion has occurred differs from the water dispersible type in that it is not readily wet by water, it is more viscous, and it usually can be confined to one roll of the mill instead of two. We find, however, that the inverted batch can be changed back to the water dispersible type by starting with a thin bank of hydrophilic colloid paste and working into it on the mill the batch containing rubber in the external phase.

The addition of small amounts of certain salts and bases, such as sodium carbonate, sodium borate and ammonium hydroxide, or other peptizing agent, to the water phase, has been found advisable in certain cases, such bases or salts serving to make the emulsion more stable.

The mixture of the rubber in such a colloid, where the latter is the continuous phase, has many uses which will occur to those familiar with the rubber industry, an example being the coating or impregnating of materials, the latex-like form of the product being especially valuable for coating or impregnating fibrous materials such as paper, as in oil proofing them.

The method described may be used for producing mixtures containing compounding ingredients in addition to those above mentioned, as by milling such ingredients into the rubber before the latter is dispersed in the colloid, or such ingredients may be added to the mixture of rubber and colloid after said mixture has been prepared as above described.

Our method also may be used as a means of obtaining a mixture of finely dispersed colloid in rubber with the latter as the continuous phase, as by milling a batch of the product above described, either in its non-inverted or its inverted form, into a mass of rubber, the colloid, in such case, being already in either a highly attenuated or in a finely dispersed form at the beginning of the milling operation. Such batch may be dried before so milling it into the rubber, or the resulting rubber compound may be dried after such milling operation.

An advantage of the non-liquid product above described, comprising the gum as a disperse phase and the colloid as a continuous phase, is that it may be conveniently handled or shipped, either in the plastic form in which it comes from the mill, or after being dried as above described.

Various modifications may be resorted to without departing from the scope of our invention, and we do not wholly limit our claims to the exact procedure described, nor wholly to the substances specifically mentioned.

We claim:

1. The method of dispersing a gum into a colloidal substance which comprises forming a viscous, plastic mass of said colloidal substance, and dispersing the gum into said mass by mastication while maintaining said colloidal substance as a continuous phase.

2. The method of dispersing a gum into a colloidal substance which comprises forming a viscous paste of said substance with a solvent, and dispersing the gum into said paste by mastication while maintaining said paste as a continuous phase.

3. The method of dispersing a gum into a hydrophilic colloid which comprises forming a viscous paste of said colloid with water, and dispersing the gum into said paste by mastication while maintaining said paste as a continuous phase.

4. The method of dispersing a gum into a colloidal substance which comprises forming a viscous paste of said colloidal substance with a solvent, masticating said paste, and adding the gum thereto, in plastic form, in successive small pieces, while so masticating said paste.

5. The method of dispersing a gum into a colloidal substance which comprises forming a viscous paste of said colloidal substance with a solvent, softening said gum, and dispersing the gum into said paste by mastication while maintaining said paste as a continuous phase.

6. The method of dispersing a gum into a colloidal substance which comprises forming a viscous paste of said colloidal substance with a solvent, softening said gum, masticating said paste, and adding the softened gum, in plastic form, in successive small pieces, to said paste, while so masticating the latter.

7. The method of dispersing a gum into a colloidal substance which comprises forming a viscous paste of said colloidal substance with a solvent, masticating said paste, adding the gum thereto, in plastic form, in successive small pieces, while so masticating said paste, and adding solvent to said paste from time to time to prevent said paste from excessively hardening.

8. The method of dispersing a gum into a colloidal substance which comprises forming a viscous paste of said colloidal substance with a solvent, softening said gum, masticating said paste, adding the softened gum, in plastic form, in successive small pieces, to said paste, while so masticating the latter, and adding solvent to said paste from time to time to prevent it from excessively hardening.

9. The method of dispersing rubber into a colloidal substance which comprises forming a viscous, plastic mass of said colloidal substance, and dispersing the rubber into said mass by mastication while maintaining said paste as a continuous phase.

10. The method of dispersing rubber into a colloidal substance which comprises forming a viscous paste of said substance with a solvent, and dispersing the rubber into said paste by mastication while maintaining said paste as a continuous phase.

11. The method of dispersing rubber into a hydrophilic colloid which comprises forming a viscous paste of said colloid with water, and dispersing the rubber into said paste by mastication while maintaining said paste as a continuous phase.

12. The method of dispersing rubber into a hydrophilic colloid which comprises forming a viscous paste of said colloid with water, masticating said paste, and adding the rubber thereto, in plastic form, in successive small pieces, while so masticating said paste.

13. The method of dispersing rubber into a hydrophilic colloid which comprises forming a viscous paste of said colloid with water, softening said rubber, masticating said paste, and adding the softened rubber, in plastic form to said paste, in successive small pieces while so masticating the latter.

14. The method of dispersing rubber into a hydrophilic colloid which comprises forming a viscous paste of said colloid with water, masticating said paste, adding the rubber thereto, in plastic form, in successive small pieces, while so masticating said paste, and adding water to said paste from time to time to prevent it from excessively hardening.

15. The method of dispersing rubber into a hydrophilic colloid which comprises forming a viscous paste of said colloid with water, softening said rubber, masticating said paste, adding the softened rubber, in plastic form, to said paste, while so masticating the latter, and adding water to said paste from time to time to prevent it from excessively hardening.

16. The method of dispersing rubber into a hydrophilic colloid which comprises forming a viscous paste of said colloid and a peptizing agent with water, masticating said paste, and adding the rubber thereto in plastic form, in successive small pieces, while so masticating said paste.

17. The method of producing a composition of matter which comprises forming a plastic, colloidal mixture of a gum and a colloid, the gum being in disperse phase, and thinning said plastic, colloidal mixture with a solvent until it is substantially liquid.

18. The method of producing a composition of matter which comprises forming a plastic, colloidal mixture of rubber and a hydrophilic colloid, the rubber being in disperse phase, and thinning said plastic, colloidal mixture with a solvent until it is substantially liquid.

19. The method of dispersing a gum into a colloidal substance which comprises forming a viscous paste of said substance with a solvent, dispersing the gum into said paste by mastication while maintaining said paste as a continuous phase, and thereafter thinning the mass with a solvent of said substance until the product is substantially liquid.

20. The method of dispersing rubber into a colloidal substance which comprises forming a viscous paste of said substance with a solvent, dispersing the rubber into said paste by mastication while maintaining said paste as a continuous phase, and thereafter thinning the mass with a solvent of said substance until the product is substantially liquid.

21. The method of dispersing rubber into a hydrophilic colloid which comprises forming a viscous paste of said colloid with water, masticating said paste, adding the rubber thereto in plastic form, in successive small pieces, while so masticating said paste, and thinning the mass with water until it is substantially liquid.

22. As a new composition of matter, a non-liquid preparation of a colloid and a gum, the gum being so dispersed in said colloid as to remain in suspension when the mixture is thinned to a substantially liquid form with a solvent of said colloid, and the ratio of the gum to total solids in the mixture being in excess 25 per cent by weight.

23. As a new composition of matter, a non-liquid preparation of a colloid and rubber, the rubber being so dispersed in said colloid as to remain in suspension when the mixture is thinned to a substantially liquid form with a solvent of said colloid, and the ratio of rubber to total solids in the mixture being in excess 25 per cent by weight.

24. As a new composition of matter, a mixture of a gum and a hydrophilic colloid produced by mastication of the two in plastic form, the gum being dispersed in a continuous phase comprising said colloid.

25. As a new composition of matter, a mixture of rubber and a hydrophilic colloid produced by mastication of the two in plastic form, the rubber being dispersed in a continuous phase comprising said colloid.

26. As a new composition of matter, a colloidal mixture of rubber and a hydrophilic colloid produced by mastication of the two in plastic form, the rubber being dispersed in a continuous phase comprising said colloid, and the ratio of rubber in the mixture being substantially the same as in natural rubber latex.

In witness whereof we have hereunto set our hands this 2 day of September, 1922.

HARLAN L. TRUMBULL.
JOHN B. DICKSON.

DISCLAIMER 1,513,139.—*Harlan L. Trumbull*, and *John B. Dickson*, Akron, Ohio. METHOD FOR THE DISPERSION OF GUM INTO A COLLOIDAL SUBSTANCE. Patent dated October 28, 1924. Disclaimer filed January 30, 1934, by the assignee, *The B. F. Goodrich Company*.

Hereby enters the following disclaimer, to wit:

Your petitioner disclaims the inclusion of all colloids or colloidal substances except organic colloids or colloidal substances in each and every one of the claims in said Patent No. 1,513,139.

[*Official Gazette February 20, 1934.*]